US005129618A

United States Patent [19]

Andersson

[11] Patent Number: 5,129,618

[45] Date of Patent: Jul. 14, 1992

[54] HYDRAULIC VALVE

[75] Inventor: Bo Andersson, Skellefteå, Sweden

[73] Assignee: Bahco Hydrauto AB, Skellefteå, Sweden

[21] Appl. No.: 513,294

[22] Filed: Apr. 24, 1990

[30] Foreign Application Priority Data

Apr. 25, 1989 [SE] Sweden ............ 8901501

[51] Int. Cl.[5] ............ F16K 31/36

[52] U.S. Cl. ............ 251/35; 251/44

[58] Field of Search ............ 251/35, 44

[56] References Cited

U.S. PATENT DOCUMENTS

| | | | |
|---|---|---|---|
| 1,046,236 | 12/1912 | Wagner | 251/44 X |
| 3,175,800 | 3/1965 | Donner et al. | 251/35 |
| 3,360,234 | 12/1967 | Thorburn | 251/44 |
| 3,905,393 | 9/1975 | Hartwig | 137/596.14 |
| 4,391,183 | 7/1983 | Broms et al. | 251/35 X |
| 4,662,601 | 5/1987 | Andersson | 251/35 |
| 4,779,836 | 10/1988 | Marklund | 251/44 X |
| 4,905,959 | 3/1990 | Andersson | 251/35 |

*Primary Examiner*—Gerald A. Michalsky
*Attorney, Agent, or Firm*—Cushman, Darby & Cushman

[57] ABSTRACT

An hydraulic valve of the flow-controlled type and including a valve housing provided with an inlet and an outlet and a valve body which is intended to coact with a valve seat in a manner to open and interrupt the connection between the inlet and outlet in dependence on a continuously controllable pilot flow in a pilot-flow channel extending from a pilot-flow chamber located on the side of the valve body remote from the valve seat to the outlet in the flow direction after the valve body. The pilot-flow chamber, in turn, communicates with the inlet via a variable constriction. For the purpose of simplifying this type of valve and rendering the valve more compact, the valve body is arranged in a recess which extends to the valve seat and which is formed concentrically with the valve seat. The recess is formed in a seat-part which incorporates one or more slots which are open towards the recess and which discharge into the pilot-flow chamber. The seat-part also includes at least one inlet port which communicates with the inlet and which also communicates with the slot or slots, such as to form the variable constriction, thereby providing a facility in which the valve body can be moved continuously between its valve-open and valve-closed positions in a controllable manner.

8 Claims, 2 Drawing Sheets

HYDRAULIC VALVE

BACKGROUND OF THE INVENTION

The present invention relates to an hydraulic valve, which inter alia, can be used as a completely novel type of blocking valve or so-called locking-valve. Such valves find use in hydraulic systems and are intended to block hydraulic lines passing to and from hydraulic motors. Such valves may also be used for the primary purpose of eliminating so-called load creep, which occurs in various types of hydraulic piston-cylinder devices or rams when under load and which, more specifically, means that any load whatsoever held by an hydraulic piston-cylinder device will be slowly lowered due to internal leakage of hydraulic medium in the hydraulic system, and particularly in operating valves present in the system.

Various valves which are intended to prevent load sink are known to the art. The use of pilot-controlled check valves is particularly known in this regard, but these valves have the drawback of being of the on/off-type, i.e. the valve body, or valve plug, of such valves can eityher take solely a fully open posiiton or a fully closed position. This is because the valve body is spring-biased in the direction of its closed position and can only be moved to its open position by a force which exceeds the spring force.

The novel type of valve to which the present invention also relates is based on the principally known technique of controlling or positionally adjusting the valve body independently or pressure, but in dependence on a pilot flow which derives from the main flow controlled by the valve, e.g. blocked.

Such hydraulic valves have the form of seat valves and, compared with conventional pressure-controlled seat valves, have been found to possess many advantages, not least because such valves, as distinct from the pressure-control valves can be set precisely to any position whatsoever between their two limit positions, i.e. between their fully open and fully closed positions, and thereby enable both large and small fluid flows to be controlled continuously with precision, as well as flows which are under pressures greater than 500 bar, without requiring the application of excessively large valve-setting forces. This latter advantage also renders this type of valve particularly useful in systems in which very high pressures occur, for instance in mobile hydraulic systems. Furthermore, because the valve-setting forces are so small, such valves can be remotely controlled with the aid of electric signals or impulses, in a very ready and simple fashion.

This new type of valve, however, also has a number of drawbacks. One primary drawback is that the operating funciton of such valves requires the provision of a valve body which is technically complicated from the aspect of manufacture. This prevents such valves from being fitted with known valve plugs that are capable of being manufactured in large numbers, or which are already available commercially in large numbers, such as spherical balls for instance. Consequently, this type of valve is more difficult and more expensive to use. Furthermore, this type of valve requires a relatively long valve body, which means that the valve itself is also relatively long and cannot be made as compact as would be desired, not least from the aspect of installation.

SUMMARY OF THE INVENTION

Accordingly, one object of this invention is to provide an hydraulic valve which can also be used as a blocking or locking valve and which is so configured as to enable the valve to be used at least in all instances where it is desired not only to achieve leakage-free blocking or locking of an hydraulic system, but also to achieve continuous valve-opening and valve-closing movement of the valve body, so as to enable an hydraulic flow to be controlled continuously irrespective of the value of the pressure prevailing in the system, and also in a manner which will enable the operator to determine, for instance, the speed at which a supported load shall be lowered. Another object of the invention is to provide a valve of the aforesaid new kind which is constructed a) so as to enable the valve to be made compact, b) so as to enable the valve to be manufactured at low costs, and c) primarily so as to enable the valve to function in the manner intended with a standard-type valve body, therewith contributing significantly to the low-cost aspect with regard to manufacture and maintenance.

These objects of the invention are achieved with a valve constructed in accordance with the invention

BRIEF DESCRIPTION OF THE DRAWINGS

The present invention will now be described in more detail with reference to the accompanying drawings, in which.

DETAILED DESCRIPTION

Figure 1:
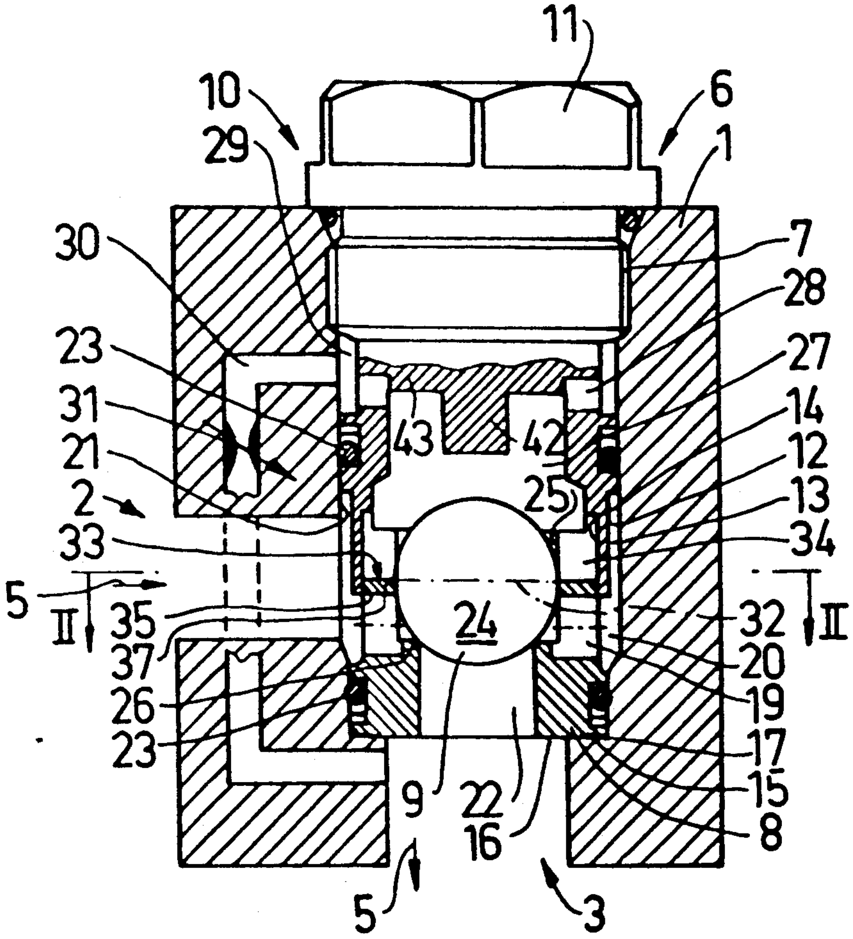
FIG. 1 is a sectional view of an inventive valve construction.

The reference numeral 1 used in the drawings identifies generally a valve housing which is provided with an inlet 2 and an outlet 3. The inlet and outlet are interconnected by a bore 4 in the housing 1 and form part of a main passageway for the passage of a main flow of medium in a direction marked with arrows 5. A valve 6, constructed in accordance with principles of the present invention, is secured detachably in the bore 4, with the aid of a scre joint 7, said valve having the form of a so-called cartridge insert.

Figure 2:
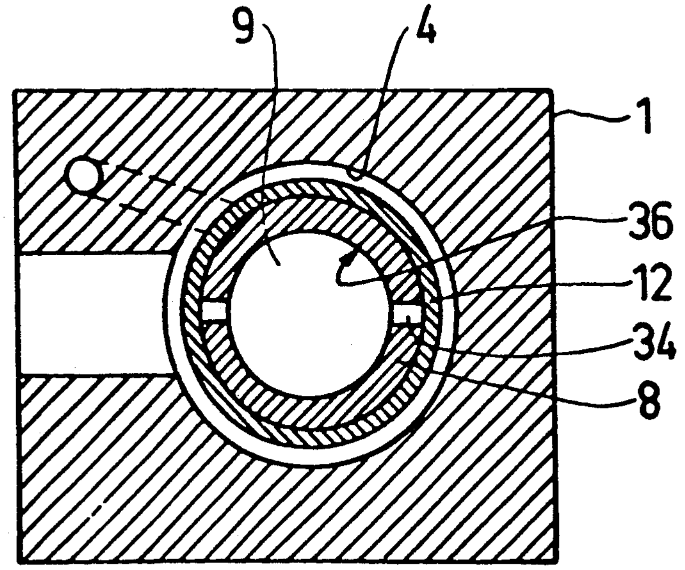
FIG. 2 is a sectional view taken on the line II—II in FIG. 1.

Referring to FIGS. 1 and 2 valve 6 of the illustrated embodiment has the form of a cartridge insert and comprises three different main-parts, namely a seat-part 8, a valve body 9, and a screw cap or insert sleeve 10. The insert sleeve 10 has at least one external screwthread which coacts with a corresponding internal screwthread inthe bore 4, such as to obtain the screw joint 7, and is also provided with a wrench grip 11 which enables the valve to be fitted into the bore 4 of the valve housing 1.

The end of the sleeve 10 distal from the wrench-grip 11 has provided thereon a cylindrical flange part 12, into which the seat-part 8 of the valve is fitted partially, with a press fit. Thus, when screwing the sleeve 10 into the bore 4 of the valve housing, one end surface of the seat-part 8 will be brought into abutment with a first should 13 provided within the bore 4, and the other end surface 16 of said seat-part will be brought into engagement with a second shoulder 15, optionally via a packing 17 located between said end surface 16 and said second shoulder 15.

When screwed into the bore 4, in which the seat-part 8 is thus fixated in its intended position, the seat-part 8 has one and preferably several inlet ports 19 in communication with one another and with the valve inlet 2, via a circumferential gap 20 defined between the valve and the wall of the bore 4 and at least one outlet port 22 located in the valve outlet 3, or communicating with the outlet port in some other way, as illustrated in FIG. 1. The valve 6 is sealed against the wall 21 of the bore 4 with the aid of annular seals 23 on both sides of the inlet ports 19.

The valve body 9 of the valve according to the embodiment illustrated in FIGS. 1 and 2 has the form of a spherical ball 24, referred to hereinafter as the valve ball 24, which is located in a circular recess 25 formed in the seat-part 8 of the valve. The recess 25 has an internal diameter which is equal to the largest external diameter of the valve ball, and has a larger internal diameter than the internal diameter of respective outlet ports 22 provided in the seat-part 8 of the valve, the outlet ports being disposed concentrically in relation to the recess 25 and in communication with the outlet 3.

When in its valve-closing position, the valve ball 24 is intended to lie in abutment with a valve seat 26 provided in the seat-part 8 of the valve, and is held in abutment with the seat with a holding force hereinafter defined in more detail.

Formed in the insert sleeve 10 of the valve, on the side of the valve ball remote from the valve seat 26, is a chamber 27 which communicates, via one or more ports 28, with a circumferential annular gap 29 disposed between the insert sleeve 10 and the wall 21 of the bore 4. A pilot flow channel 30 extends from the gap 29 to the valve outlet 3. Fitted in the channel 30 is a control device 31, shown purely schematically in FIG. 1, which may consist, for instance, of a throttle valve or pilot-flow valve whose settings can be adjusted continuously and smoothly between a fully open and a fully closed position, such as to control the pilot flow from the pilot-dlow chamber 27 to the valve outlet 3 in a continuous and smooth fashion.

When the valve ball 24 of the FIG. 1 embodiment is in abutment with the valve seat 26, and therewith closes the main passageway through the valve, the diametric plane 32, shown in chain dot line, will lie essentially in line with the bottom 33 of one or more, preferably two, slots 34 disposed diametrically in the seat-part 8, these slots being delimited from the inlet ports 19 and the valve inlet 2 and opening into the pilot-flow chamber 27. One side of the slot 34 is connected with the recess 25 in whcih the valve ball 24 is located, whereas the other side of the slots is connected to the circular or cylindrical flange-part 12 of the insert sleeve.

As a result of the spherical shape of the valve body, or valve ball, and of the placement or position of the diametric plane 32 of said spherical body in register with the bottom 33 of respective slot swhen the valve ball rests against its seat 26, there will constantly prevail a certain degree of communication with the pilot flow chamber, past the valve ball 24. Consequentl, the hydraulic pressure prevailing in the valve inlet 2 will also prevail int he chamber 27 and will act on that surface of the valve ball present in the chamber, therewith holding the valve ball 24 in abutment with its seat 26 with a holding force commensurate with the area of said surface, provided that the control unit 31 is in its closed position. When in its closed position, the control unit 31 will not permit the occurrence of any pilot flow in the pilot-flow channel 30 and will therewith also prevent the exit of pressure medium from the chamber 27. The pressure in the chamber 27 will therewith be the same as the pressure in the valve inlet 2, i.e. the same as the pressure upstream of the valve ball 24, as seen in the direction of flow. As is known, the pressure will always be higher on the inlet or pressure side of the valve than on its outlet side, and the pressure prevailing in the pilot-flow chamber will therewith generate on that surface of the valve ball which faces towards thge chamber 27 a holding force which, due to the area ratios that prevail, is greater than the counterpressure which is dependent on valve-inlet-port pressure and which acts on that zone of the spherical surface of said valve ball which is bordered by the diametric plane 32 and a plane which extends parallel therewith through the valve seat 26, the pressure thereby holding the valve ball 24 in abutment with its seat 26, and therwith in its valve-closing position, provided that the control unit 31 is unactivated and closed.

Due to the pressure differences which prevail on different sides of the valve ball, activation of the control unit 31, even to a small extent, will automatically result in a pilot flow from th epilot-flow chamber 27 to the valve outlet 3, downstream of the valve seat 26 through the pilot-flow channel 30, therewith causing the valve ball 24 to move away from its seat 26 and open the connection between the valve inlet and valve outlet 2, 3 and thus through the valve 6. The valve ball 24 is caused to move from its seat 26 through a distance necessary to obtain an equilibrium between the flow past the valve ball 24 to the chamber 27 and the pilot flow through the control unit 31 and the pilot-flow channel 30 to the outlet 3. Immediately after the valve ball 24 leaves its set 26, the slots 34 are exposed to an increasing extent, therewith increasing the through-flow area past the valve ball 24 with increasing distances of the valve ball 13 from its seat 26. The slots 33 thus function as a variable constrition. As a result of the continuous, i.e. unbroken, fluid-control afforded by the control unit 31, the valve ball 24 will also be controlled between its two limit positions in a smooth and continuous fashion, therewith providing continuous control of the flow through the valve 6, irrespective of the prevailing pressure. When the control unit 31 is brought to its closed position and a pilot flow no longer exists, the pressure in the pilot-flow chamber 27 will again rise and causee the valve ball 24 to move automatically downwards, so as to bring the valve ball finally into abutment with its valve seat 26 and therewith shut-off the valve 6.

In the case of the embodiment of the valve illsutrated in FIGS. 1 and 2, there is a very small connection between the main passageway upstream of the valve ball 24 held in its closed posiiton, due to the fact that the diametric plane 32 of the valve ball is located on a level with the bottom s33 of the diametrically positioned slots functioning as a variable constriction. This connection, necessary to the operational function of the valve, can, however, be achieved in another way and it thus lies within the scope of the invention instead to position the valve ball 24 such that the diametric plane 32 of the ball will lie in the region between the bottom 33 of respective slots and the upper defining surface 35 of the inlet ports. In this case, when the valve ball 24 occupies its valve-closing position, the valve ball will not permit any hydraulic medium to pass from the main passageway to the pilot-flow chamber 27, due to its linear abutment with the wall part 36 of the recess. The connection betweent he main passageway and the pilot-flow chamber 27 necessary to the operational function of the valve can, in this case, be achieved by providing a plurality of holes of very small diameter in the partition wall 37 between the slot 34 and the inlet ports 19.

Figure 3:
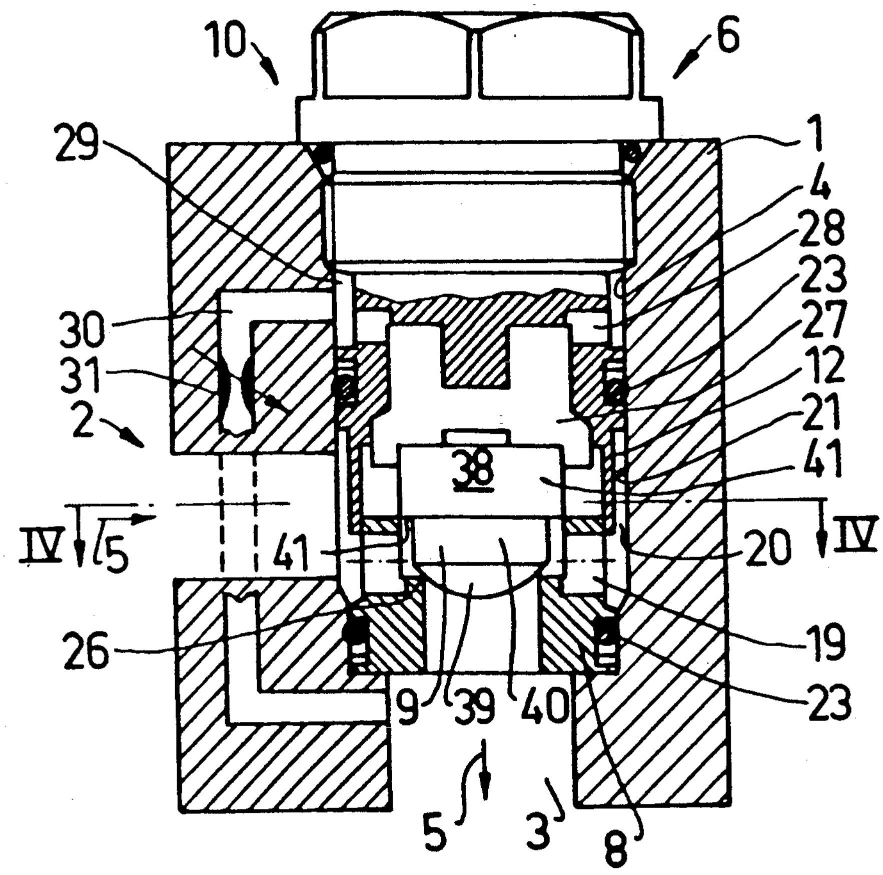
FIG. 3 is a sectional view of a slightly modified version of the inventive valve constructionf and FIG. 4 is a sectional view taken on the line IV—IV in FIG. 3.
Figure 4:
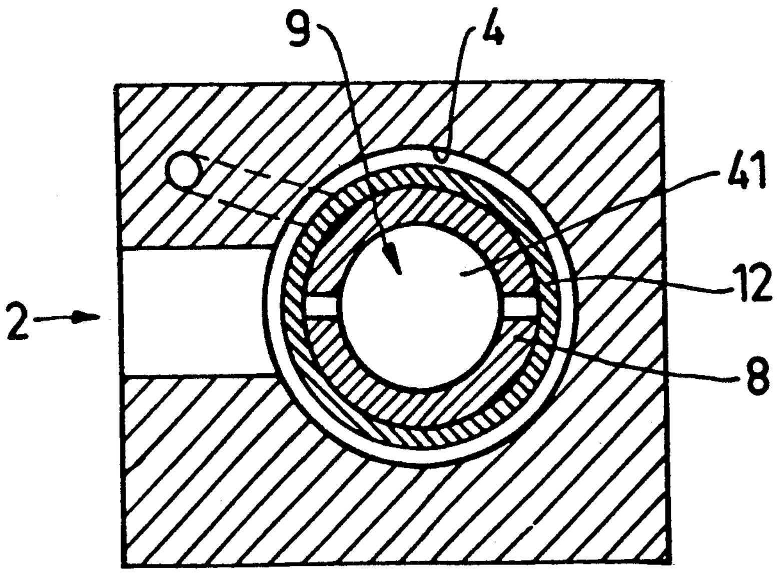

FIGS. 3 and 4 illustrate a modified embodiment of the inventive valve. The sole difference between this embodiment and the embodiment illustrated in FIGS. 1 and 2 is that the valve body 9 has a different configuration, although the function of the valve body is the same as that of the spherical valve body 24. The shape-modified valve body, here referenced 38, includes a spherical segment 37 intended for coaction with the valve seat 26, a first cylindrical part 40, with which said spherical segment merges and which has an external diameter smaller than the internal diameter of the recess 25, and a second cylindrical part 41 having an external diameter which is so adapted to the internal diameter of said recess as to provide a slide fit between the recess 24 and the second cylindrical part 41 of the valve body 38. The transition or separation plane 41 between the two cylindrical parts 40 and 41 corresponds to the diametric plane 32 of the valve ball and, in the closing position of the valve body, shall thus lie on a level with the bottom 33 of the slots functioning as a variable constriction, so as to provide the requisite connection between the inlet 2 and the pilot-flow chamber 27. This modified embodiment may also comprise small holes formed in the partition wall 37 between the slots 34 and the inlet ports 19, in order to form the requisite connection between the inlet 2 and the pilot-flow chamber 27, in which case the separation plane 41 between the two cylindrical parts 40 and 41 of the valve body 38 shall be located in the region beneath the bottom planes 33 of the slots when the valve body 30 is in its valve-closing position.

For the purpose of restricting movement of the valve body away from its seat, a peg 42 may be arranged to extend into the pilot-flow chamber 27, as illustrated in the drawings, although this movement restriction can also be achieved with the aid of the "roof" 43 of the chamber 27, by positioning said roof on a level with the free end of the illustrated peg.

It will be understood that the present invention is not restricted to the aforedescribed and illustrated embodiments, and that changes and modifications can be made within the scope of the invention concept as defined in the following claims.

I claim:

1. An hydraulic valve of the kind which is flow-controlled comprising:

a valve housing having an inlet means and an outlet means, a bore for communicating said inlet means with said outlet means for permitting flow of a medium in a flow direction and a valve body which is arranged to coact with a valve seat provided in said bore for the purpose of opening and interrupting communication between said inlet means and said outlet means in dependence on a continuously controllable pilot flow in a pilot-flow channel which is provided extending from a pilot-flow chamber located on a side of said valve body remote from said valve seat to said outlet means in said flow direction after the valve body, said pilot-flow chamber communicating with said inlet means via a variable constriction, said valve body being arranged in a recess which extends to said valve seat, said recess being configured concentrically relative to said seat; said recess being formed in a seat-part which forms part of said valve and which incorporates at least one slot, each of which is open towards said recess and discharges into said pilot-flow chamber, and at least one inlet port which connects with said inlet means and which also communicates with each said slot such as to form said variable constriction, thereby providing a facility whereby said valve body can be moved continuously between opening and closing positions in relation to said valve seat, in a controllable fashion.

2. A valve according to claim 1, wherein:

said valve body includes a spherical part which is arranged for coaction with said valve seat.

3. A valve according to claim 2, wherein:

said valve body is a spherical ball having an external surface providing said spherical part.

4. A valve according to claim 3, wherein:

when the valve ball occupies a valve-closed position in relation to said valve seat and thus lies in abutment with said valve seat, a diametric plane of said valve ball lies substantially on a level with a bottom of each said slot, such as to form a connection between each said slot and said inlet port of said seat-part.

5. A valve according to claim 1, wherein:

said valve body includes a spherical segment which coacts with said valve seat, a first cylindrical part having a diameter which is the same as a diameter of said spherical segment, and a second cylindrical part which is mounted with a slide-fit in said recess, and a partition plane of said valve body between the two said cylindrical parts being located substantially on a level with a bottom of each said slot, such as to form a connection between each said slot and said inlet port of said seat-part, when said valve body occupies a valve-closing position in relation to said valve seat.

6. A valve according to claim 1 wherein:

said seat-part includes as said at least one slot at least one pair of slots, in each of which two slots thereof are disposed diametrically opposed in relation to one another.

7. A valve according to claim 1 wherein:

said seat-part is provided in said bore in said valve housing and is held in position in said bore by means of an insert sleeve which is screwed into said bore and which has a cylindrical flange part which partially embraces said seat-part and which forms part of said pilot-flow chamber.

8. A valve according to claim 7, wherein:

for restricting movement of said valve-body in a direction away from said valve seat, said valve further includes a peg which extends from said insert sleeve into said pilot-flow chamber.

* * * * *